US010981566B2

(12) United States Patent
Pitale et al.

(10) Patent No.: US 10,981,566 B2
(45) Date of Patent: Apr. 20, 2021

(54) METHOD FOR COLLISION AVOIDANCE OF A MOTOR VEHICLE WITH AN EMERGENCY VEHICLE AND A RELATED SYSTEM AND MOTOR VEHICLE

(71) Applicant: Bayerische Motoren Werke Aktiengesellschaft, Munich (DE)

(72) Inventors: Mandar Pitale, Neu-Ulm (DE); Christian Rempis, Osnabrueck (DE); Christian Connette, Langenau (DE); Sebastian Gruenwedel, Ulm (DE); Benjamin Sobotta, Ulm (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 235 days.

(21) Appl. No.: 16/013,205

(22) Filed: Jun. 20, 2018

(65) Prior Publication Data
US 2018/0297593 A1 Oct. 18, 2018

Related U.S. Application Data

(63) Continuation of application No. PCT/EP2016/077425, filed on Nov. 11, 2016.

(30) Foreign Application Priority Data

Dec. 21, 2015 (DE) ...................... 10 2015 226 232.4

(51) Int. Cl.
*B60W 30/095* (2012.01)
*B60W 30/09* (2012.01)
(Continued)

(52) U.S. Cl.
CPC ........... *B60W 30/0956* (2013.01); *B60Q 9/00* (2013.01); *B60W 30/08* (2013.01); *B60W 30/09* (2013.01);
(Continued)

(58) Field of Classification Search
CPC ............. B60W 30/0956; B60W 30/08; B60W 30/095; B60W 50/14; B60W 30/09;
(Continued)

(56) References Cited

U.S. PATENT DOCUMENTS

2002/0154217 A1 10/2002 Ikeda
2004/0233067 A1 11/2004 Cho
(Continued)

FOREIGN PATENT DOCUMENTS

CN 101641248 A 2/2010
CN 101859494 A 10/2010
(Continued)

OTHER PUBLICATIONS

PCT/EP2016/077425, International Search Report dated Feb. 8, 2017 (Three (3) pages).
(Continued)

*Primary Examiner* — Jonathan M Dager
*Assistant Examiner* — Jean W Charleston
(74) *Attorney, Agent, or Firm* — Crowell & Moring LLP

(57) ABSTRACT

A method for collision avoidance of a motor vehicle with an emergency vehicle includes detecting surroundings of the motor vehicle using an optical detection arrangement, detecting wider surroundings of the motor vehicle using an acoustic detection arrangement, and detecting traffic users in the surroundings. The wider surroundings are investigated to detect a signal indicative of an emergency signal of the emergency vehicle, and a trajectory of motion for each of the detected traffic user is determined. If emergency signal is detected, a further investigation is undertaken to detect behavior that is indicative of a hazardous situation in the surroundings. If the behavior indicative of the hazardous situation detected, then the method also includes locating a position of the emergency vehicle and determining a trajec-
(Continued)

tory of motion for the emergency vehicle based on the position of the emergency vehicle and the determined trajectories of motion of the detected traffic users. In addition, it is determined whether a collision of the motor vehicle with the emergency vehicle will occur for a current trajectory of motion of the motor vehicle based on the determined trajectory of motion for the emergency vehicle, and a warning is output to a user of the motor vehicle based on determining that the collision will occur.

17 Claims, 6 Drawing Sheets

(51) Int. Cl.
*G06K 9/00* (2006.01)
*G08G 1/16* (2006.01)
*B60W 30/08* (2012.01)
*G08G 1/0965* (2006.01)
*B62D 15/02* (2006.01)
*B60Q 9/00* (2006.01)
*B60W 50/14* (2020.01)

(52) U.S. Cl.
CPC .......... *B60W 30/095* (2013.01); *B60W 50/14* (2013.01); *B62D 15/0265* (2013.01); *G06K 9/00791* (2013.01); *G06K 9/00825* (2013.01); *G08G 1/0965* (2013.01); *G08G 1/166* (2013.01); *B60W 2050/143* (2013.01); *B60W 2420/42* (2013.01); *B60W 2420/54* (2013.01)

(58) Field of Classification Search
CPC ....... B60W 2050/143; B60W 2420/42; B60W 2420/54; B60W 2554/408; B60W 2554/80; B60W 2554/00; G06K 9/00791; G06K 9/0085; G08G 1/0965; G08G 1/166; B62D 15/0265; B60Q 9/00
USPC ........................................................ 701/301
See application file for complete search history.

(56) References Cited

U.S. PATENT DOCUMENTS

| | | | | |
|---|---|---|---|---|
| 2008/0086241 A1* | 4/2008 | Phillips | ................ | G05D 1/0038 701/2 |
| 2008/0097699 A1* | 4/2008 | Ono | .................. | B62D 15/0265 701/300 |
| 2008/0150755 A1 | 6/2008 | Van Zandt et al. | | |
| 2010/0082251 A1* | 4/2010 | Kogure | .................. | G08G 1/165 701/301 |
| 2014/0200738 A1* | 7/2014 | Wanami | ............... | G07C 5/0858 701/1 |
| 2014/0236414 A1* | 8/2014 | Droz | ...................... | G08G 1/166 701/28 |
| 2015/0151749 A1* | 6/2015 | Tsuchiya | ............... | B60W 10/20 701/41 |
| 2015/0161458 A1* | 6/2015 | Agnew | .............. | G06K 9/00825 382/104 |
| 2015/0321698 A1* | 11/2015 | Fuehrer | .................. | G08G 1/162 701/41 |
| 2017/0132334 A1* | 5/2017 | Levinson | ................ | G06F 30/20 |

FOREIGN PATENT DOCUMENTS

| | | | | |
|---|---|---|---|---|
| CN | 102582599 A | 7/2012 | | |
| CN | 103597527 A | 2/2014 | | |
| CN | 103987577 A | 8/2014 | | |
| CN | 104340117 A | 2/2015 | | |
| CN | 104802796 A | 7/2015 | | |
| CN | 104903915 A | 9/2015 | | |
| CN | 105026247 A | 11/2015 | | |
| CN | 105035081 A | 11/2015 | | |
| CN | 105035082 A | 11/2015 | | |
| CN | 105593074 A | 5/2016 | | |
| DE | 10 2010 022 165 A1 | 1/2011 | | |
| DE | 102010022165 A1 * | 1/2011 | .......... | G08G 1/0965 |
| DE | 10 2012 200 950 B3 | 5/2013 | | |
| DE | 10 2014 200 700 A1 | 7/2015 | | |
| EP | 1 539 523 B1 | 6/2005 | | |
| JP | 2000-095130 A | 4/2000 | | |
| JP | 2014-154128 A | 8/2014 | | |
| JP | 2014-206804 A | 10/2014 | | |
| WO | WO 2013/052127 A1 | 4/2013 | | |

OTHER PUBLICATIONS

German Search Report issued in German counterpart application No. 10 2015 226 232.4 dated Jul. 25, 2016, with Statement of Relevancy (Ten (10) pages).

Chinese Office Action issued in Chinese application No. 201680066808.7 dated Sep. 8, 2020 (Five (5) pages).

* cited by examiner

METHOD FOR COLLISION AVOIDANCE OF A MOTOR VEHICLE WITH AN EMERGENCY VEHICLE AND A RELATED SYSTEM AND MOTOR VEHICLE

CROSS REFERENCE TO RELATED APPLICATIONS

This application is a continuation of PCT International Application No. PCT/EP2016/077425, filed Nov. 11, 2016, which claims priority under 35 U.S.C. § 119 from German Patent Application No. 10 2015 226 232.4, filed Dec. 21, 2015, the entire disclosures of which are herein expressly incorporated by reference.

BACKGROUND AND SUMMARY OF THE INVENTION

The present invention concerns a method for collision avoidance of a motor vehicle with an emergency vehicle and a related system and motor vehicle.

Modern motor vehicles are ever better sound-insulated against the surroundings thereof. This contributes to increased ride comfort, because external noise is often perceived as disturbing. As a result, driving safety can also be increased, because said noise can also irritate and/or distract the driver.

As a result however, emergency vehicles in emergency use may not be noticed or no longer noticed in a timely manner. If there is no visual awareness of the emergency vehicle, then together with audible non-awareness this can lead to hazardous and accident-prone situations.

Therefore, it would be desirable to provide a capability with which emergency vehicles can be detected in a timely manner and a vehicle user can be suitably informed.

It is the aim of the invention to propose a capability that avoids or at least reduces at least some of the known disadvantages of the prior art.

In this case, the subject matter of the primary claim concerns a method for collision avoidance of a motor vehicle with an emergency vehicle, the method including: Optical detection of the surroundings of the motor vehicle by means of an optical detection arrangement of the motor vehicle. Acoustic detection of the wider surroundings of the motor vehicle by means of an acoustic detection arrangement of the motor vehicle, wherein the wider surroundings include the surroundings. Determining traffic users in the surroundings. Investigating the wider surroundings for a signal, wherein the signal is indicative of an emergency signal of an emergency vehicle. Determining a trajectory of motion for each detected traffic user. And if the examination of the wider surroundings detects a suitable emergency signal: Investigating the detected trajectories of motion for swarming behavior, wherein the swarming behavior is indicative of a hazardous situation in the surroundings. And if the examination of the detected trajectories of motion detects a suitable hazardous situation in the surroundings: Locating the position of the emergency vehicle.

Determining a trajectory of motion for the emergency vehicle based on the located position of the emergency vehicle and the detected trajectories of motion of the traffic users.

Anticipating whether a collision of the motor vehicle with the emergency vehicle will occur for a current trajectory of motion of the motor vehicle based on the detected trajectory of motion for the emergency vehicle. And if the anticipation result is that the collision will occur: Outputting a suitable warning indication to a user of the motor vehicle.

The steps of the method can be carried out in an automated manner during this.

The surroundings of the motor vehicle within the scope of the invention can mean here an area around the motor vehicle. In particular, an area around the motor vehicle can be meant here that can be detected by means of an optical detection arrangement. In this case, the area around the motor vehicle can be meant that is detectable by the optical detection arrangement and that can be clearly resolved so that object recognition is still possible.

Here an optical detection arrangement within the scope of the invention can mean an arrangement that enables the visual detection of the surroundings. This can be carried out by means of optical means, but also by means of infrared or even scanning, such as for example by means of radar and/or lidar and similar.

The wider surroundings of the motor vehicle within the scope of the invention can mean a second area around the motor vehicle. Said area can be similar to the surroundings. However, it can also differ significantly therefrom. In particular, in this case an area around the motor vehicle can be meant that can be detected by means of an acoustic detection arrangement. Therefore, in particular in urban environments, the wider surroundings can be more wide-ranging than the surroundings themselves.

An acoustic detection arrangement within the scope of the invention can be an arrangement that is arranged to detect acoustic signals. In particular, in this case an arrangement can be meant that is arranged to detect acoustic signals such as those emitted by emergency vehicles, such as police, the fire service, an emergency doctor and similar, during a corresponding emergency action. Such an acoustic detection arrangement can also detect acoustic signals such as those emitted by so-called "rumblers" of emergency vehicles. As a rule, said signals are not detectable by the human ear as a note, but are perceived by people as a vibration.

A traffic user in the surroundings within the scope of the invention can mean a road traffic user. In particular, in this case it can mean potentially fast road traffic users, such as motor vehicles. However, it can also mean passersby, cyclists and similar.

A signal within the scope of the invention can mean an acoustic sound wave. In particular, the signal can mean an acoustic warning, such as those emitted by emergency vehicles, such as police, the fire service, emergency doctors and similar, during a corresponding emergency action.

A trajectory of motion within the scope of the invention can be a virtual path that is indicative of the path to be traversed by a motor vehicle. In particular, a trajectory of motion can determine which path a motor vehicle should take. This can in particular be achieved by a number of trajectories that can be placed adjacent to each other.

A swarming behavior within the scope of the invention can mean where many objects behave similarly, similarly to a shoal of fish or a flock of birds. In particular, this can mean that objects that are at least close together or along a direction of motion have a very similar or consistent motional behavior.

Anticipation within the scope of the invention means a perception based on previous information or behavior. In this case, the anticipation can be carried out based on a logical or even logically stringent information chain of previously observed events.

A warning within the scope of the invention means a notification that is carried out because of an impending danger. Such a warning can comprise an acoustic, visual and/or haptic indication. Moreover, a warning can also comprise behavioral information regarding how to respond to the impending danger.

The lesson according to the invention gives the advantage that an impending hazardous situation that is due to the emergency operation of an emergency vehicle can be identified and a vehicle user can be forewarned accordingly.

As a result, accidents can be avoided in such situations.

The subject matter of an independent claim concerns a system for collision avoidance of a motor vehicle with an emergency vehicle, wherein the motor vehicle comprises: An optical detection arrangement for the optical detection of the surroundings of the motor vehicle. An acoustic detection arrangement for the acoustic detection of the wider surroundings of the motor vehicle, wherein the wider surroundings includes the surroundings. And an output arrangement for outputting a warning to a user of the motor vehicle. The system comprises: A first means of determination for determining traffic users in the surroundings. A means of investigation for investigating the wider surroundings for a signal, wherein the signal is indicative of an emergency signal of an emergency vehicle. A second means of determination for determining a trajectory of motion for each detected traffic user. A further means of investigation for investigating the detected trajectories of motion for swarming behavior, wherein the swarming behavior is indicative of a hazardous situation in the surroundings. A means of location for locating a position of the emergency vehicle. A third means of determination for determining a trajectory of motion for the emergency vehicle based on the located position of the emergency vehicle and the detected trajectories of motion of the traffic users. And a means of anticipation for anticipation of whether a collision of the motor vehicle with the emergency vehicle will occur for the current trajectory of motion of the motor vehicle and based on the detected trajectory of motion for the emergency vehicle. And during this the system is arranged to carry out any method according to the invention.

As a result of the lesson according to the invention, the advantage is achieved that a system can be provided to identify an impending hazardous situation caused by an emergency operation of an emergency vehicle and that a vehicle user can be suitably forewarned.

The subject matter of a further independent claim concerns a motor vehicle, comprising: An optical detection arrangement for the optical detection of the surroundings of the motor vehicle. An acoustic detection arrangement for the acoustic detection of the wider surroundings of the motor vehicle, wherein the wider surroundings includes the surroundings. An output arrangement for outputting a warning to a user of the motor vehicle. And any system according to the invention, wherein the system is arranged to carry out any method according to the invention.

By means of the lesson according to the invention, the advantage is achieved that an impending hazardous situation due to an emergency operation of an emergency vehicle can be identified in a motor vehicle and a vehicle user of the motor vehicle can be forewarned accordingly.

As a result, damage to the motor vehicle and injury to the occupants of the vehicle can be avoided in such an exceptional situation.

The subject matter of a further independent claim concerns a computer program product for a system and/or a motor vehicle, wherein the system and/or motor vehicle can be operated according to any method according to the invention.

As a result of the lesson according to the invention, the advantage is achieved that the method can be implemented particularly efficiently in an automated manner.

The subject matter of a further independent claim concerns a data medium comprising a computer program product according to the invention.

As a result of the lesson according to the invention, the advantage is achieved that the method can be distributed or maintained particularly efficiently on the arrangements, systems and/or motor vehicles that are implementing the method.

Before the embodiments of the invention are described in more detail below, it should first be noted that the invention is not limited to the described components or the described steps of the method. Furthermore, the terminology used is also not a restriction, but is only of an exemplary nature. Insofar as the singular is used in the description and the claims, the plural is included in each case, unless the context explicitly excludes this. Any steps of the method can be carried out automatically, unless the context explicitly excludes this.

Further exemplary embodiments of the method according to the invention are described below.

According to a first exemplary embodiment, the method further includes that the respective determined corresponding trajectory of motion for the respective corresponding traffic user corresponds to the respective corresponding most likely trajectory of motion for said corresponding traffic user.

Said embodiment has the advantage that it can respond to the most likely event to occur. By carrying out the method cyclically, as a result the method can approximate to the event that actually occurs in the future and thus can much more reliably predict whether there is a risk of collision.

According to a further exemplary embodiment, the method further includes that the located position of the emergency vehicle corresponds to the most likely position of the emergency vehicle. And the method further includes that the determined trajectory of motion for the emergency vehicle corresponds to the most likely trajectory of motion of the emergency vehicle.

Said embodiment has the advantage that it can respond more accurately to the event that is most likely to occur. By carrying out the method cyclically, as a result the method can still better approximate to the event that actually occurs in the future and thus can much more reliably predict whether there is a risk of collision.

According to a further exemplary embodiment, for the case in which the anticipation gives the result that the collision will occur, the method further includes determining a collision-free trajectory of motion of the motor vehicle.

Said embodiment has the advantage that in the case of a collision prediction an avoidance option can be determined that can be output to the vehicle user as an instruction.

As a result, accidents can be avoided even better in such exceptional situations.

According to a further exemplary embodiment, the method also includes that the motor vehicle is a motor vehicle that is operated in a highly automated manner and/or an autonomously operable motor vehicle.

Said embodiment has the advantage that the method can be coupled to a driver assistant or to an autonomous driving system in order to be able to independently carry out suitable avoidance by the motor vehicle in the case of a collision prediction.

According to a further exemplary embodiment, the method also includes that the surroundings move along the current trajectory of motion of the motor vehicle. And in this case, the wider surroundings include an area that differs from an area in the surroundings, and/or wherein the area in the wider surroundings is larger than the area in the surroundings.

Said embodiment has the advantage that yet more timely risk identification is possible.

According to a first exemplary embodiment, the system further includes: A fourth means of determination for determining a collision-free trajectory of motion of the motor vehicle. And a collision avoidance arrangement for automatically applying and implementing the collision-free trajectory of motion by the motor vehicle.

Said embodiment has the advantage that as a result the motor vehicle can be capable of independently carrying out corresponding avoidance by the motor vehicle in the case of a collision prediction.

The invention thus enables a hazardous situation that will probably occur because of an exceptional situation, such as can exist in road traffic owing to the emergency use of a motor vehicle, to be predicted and suitably warned of in advance.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
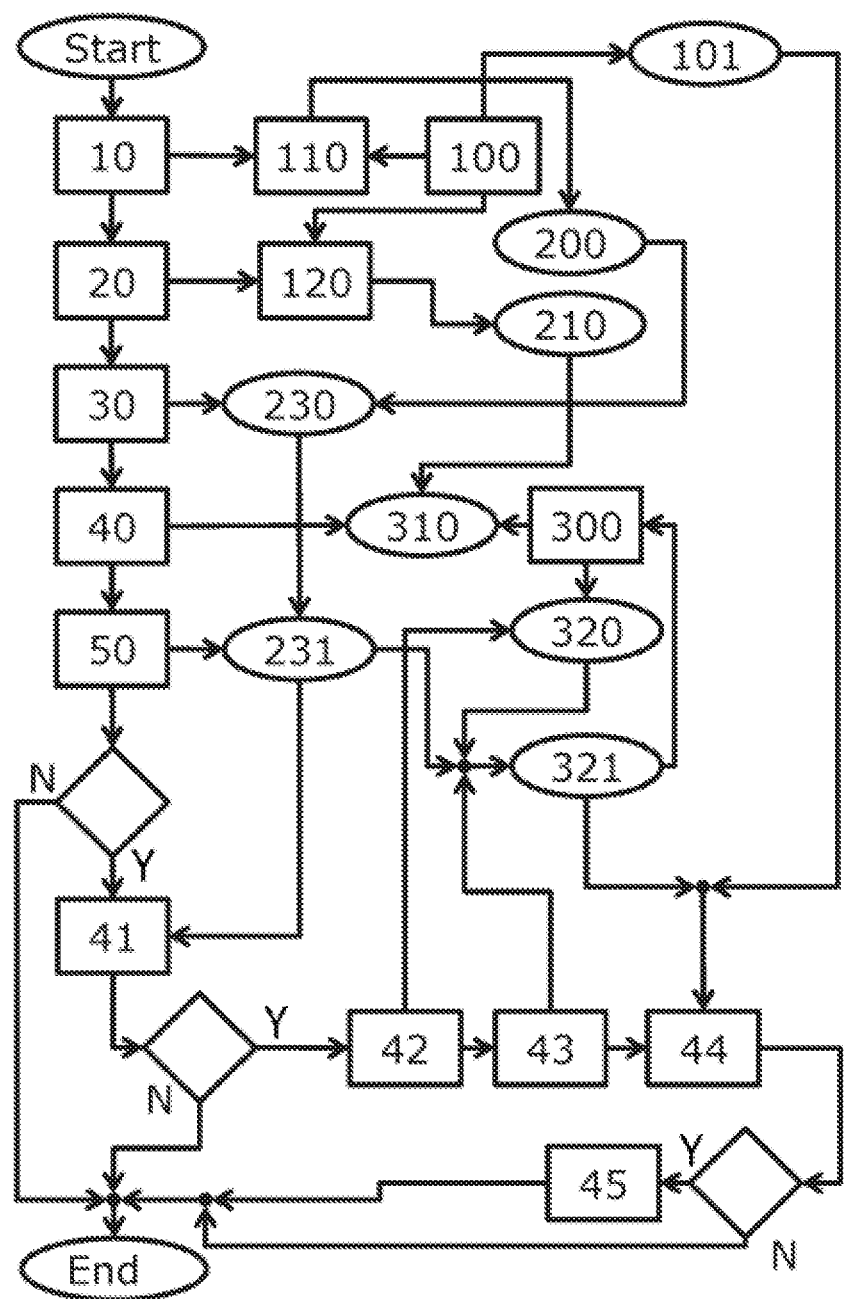
FIG. 1 shows a schematic representation of a proposed method according to an exemplary embodiment of the invention.

FIG. 1 shows a schematic representation of a proposed method according to an exemplary embodiment of the invention.

In this case, FIG. 1 shows a schematic representation of a method for collision avoidance of a motor vehicle 100 with an emergency vehicle 300. In this case, the method includes: Optical detection 10 of the surroundings 200 of the motor vehicle 100 by means of an optical detection arrangement 110 of the motor vehicle 100. Acoustic detection 20 of the wider surroundings 210 of the motor vehicle 100 by means of an acoustic detection arrangement 120 of the motor vehicle 100, wherein the wider surroundings 210 includes the surroundings 200. Determining 30 traffic users 230 in the surroundings 200. Investigating 40 the wider surroundings 210 for a signal 310, wherein the signal 310 is indicative of an emergency signal of an emergency vehicle 300. Determining 50 a trajectory of motion 231 for each detected traffic user 230. And if the investigating 40 of the wider surroundings 210 determines a corresponding emergency signal: Investigating 41 the detected trajectories of motion 231 for swarming behavior, wherein the swarming behavior is indicative of a hazardous situation in the surroundings 200. And if the investigation 41 of the detected trajectories of motion 231 determines a corresponding hazardous situation in the surroundings 200: Locating 42 a position 320 of the emergency vehicle 300. Determining 43 a trajectory of motion 321 for the emergency vehicle 300, based on the located position 320 of the emergency vehicle 300 and the detected trajectories of motion 231 of the traffic user 230. Anticipating 44 whether a collision of the motor vehicle 100 with the emergency vehicle 300 will occur for a current trajectory of motion 101 of the motor vehicle 100 and based on the detected trajectory of motion 321 for the emergency vehicle 300. And if the anticipation 44 gives the result that the collision will occur: Outputting 45 a corresponding warning to a user of the motor vehicle 100.

Figure 2:
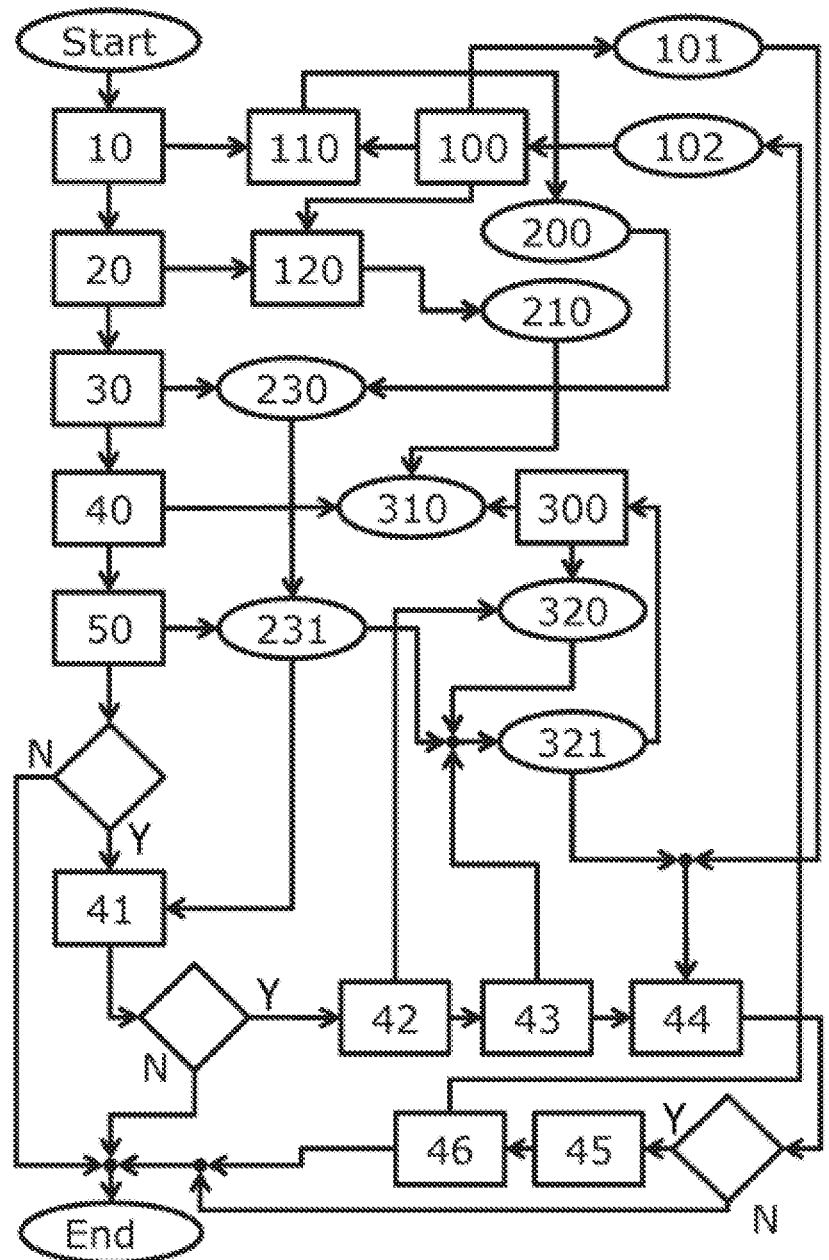
FIG. 2 shows a schematic representation of a proposed method according to a further exemplary embodiment of the invention.

FIG. 2 shows a schematic representation of a proposed method according to a further exemplary embodiment of the invention.

In this case, FIG. 2 shows a schematic representation of a method that is developed relative to FIG. 1. Statements previously applied to FIG. 1 therefore also apply to FIG. 2.

FIG. 2 shows the method of FIG. 1, wherein the method further includes: determining 46 a collision-free trajectory of motion 102 of the motor vehicle 100 in the case in which the anticipation 44 gives the result that the collision will occur.

Figure 3:
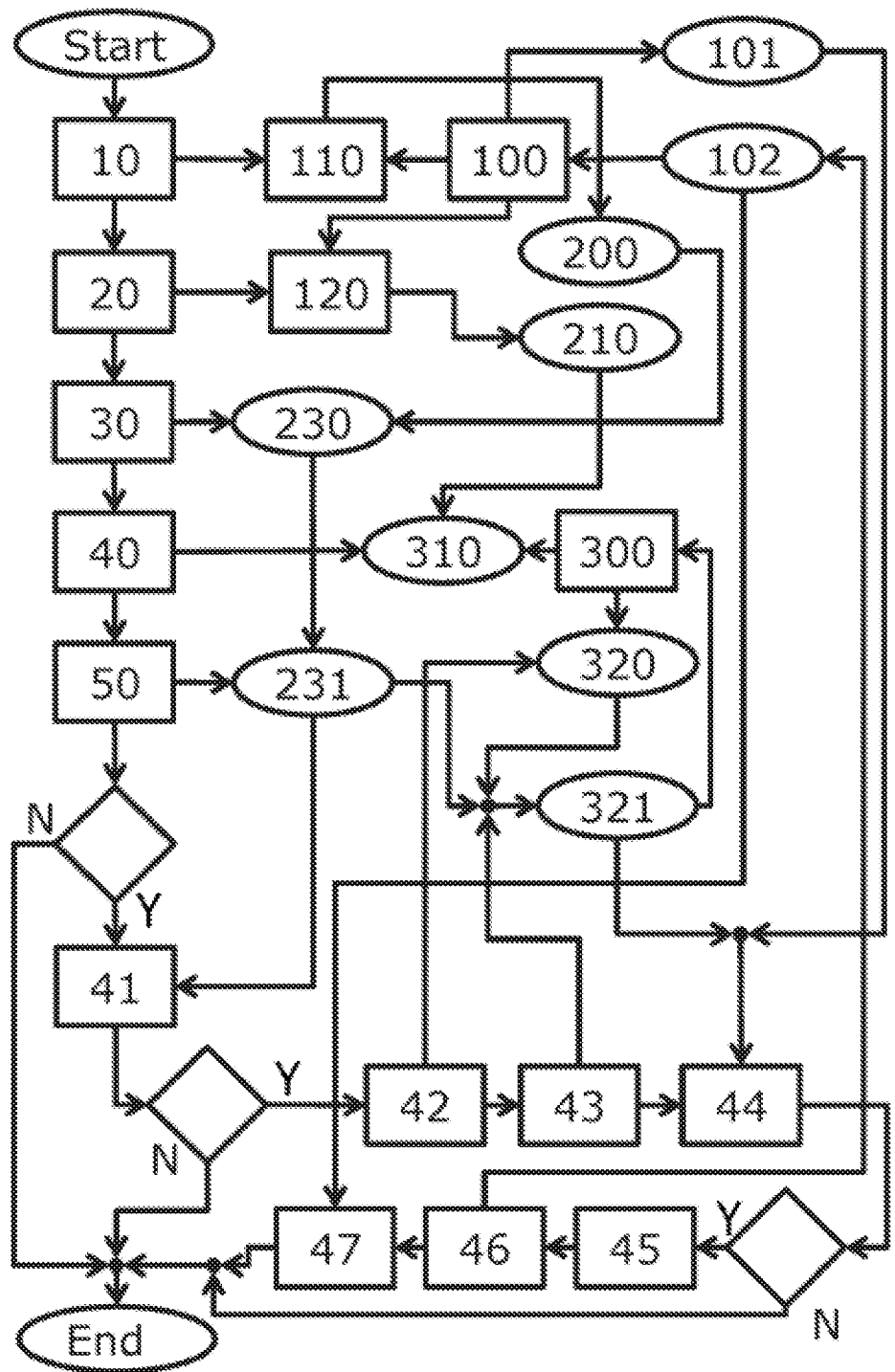
FIG. 3 shows a schematic representation of a proposed method according to a further exemplary embodiment of the invention.

FIG. 3 shows a schematic representation of a proposed method according to a further exemplary embodiment of the invention.

In this case, FIG. 3 shows a schematic representation of a method that is developed relative to FIG. 1 and FIG. 2. Statements previously made regarding FIG. 1 and FIG. 2 therefore also apply to FIG. 3.

FIG. 3 shows the method of FIG. 1, wherein the method further includes: automatically applying and implementing 47 the collision-free trajectory of motion 102 by the motor vehicle 100.

Figure 4:
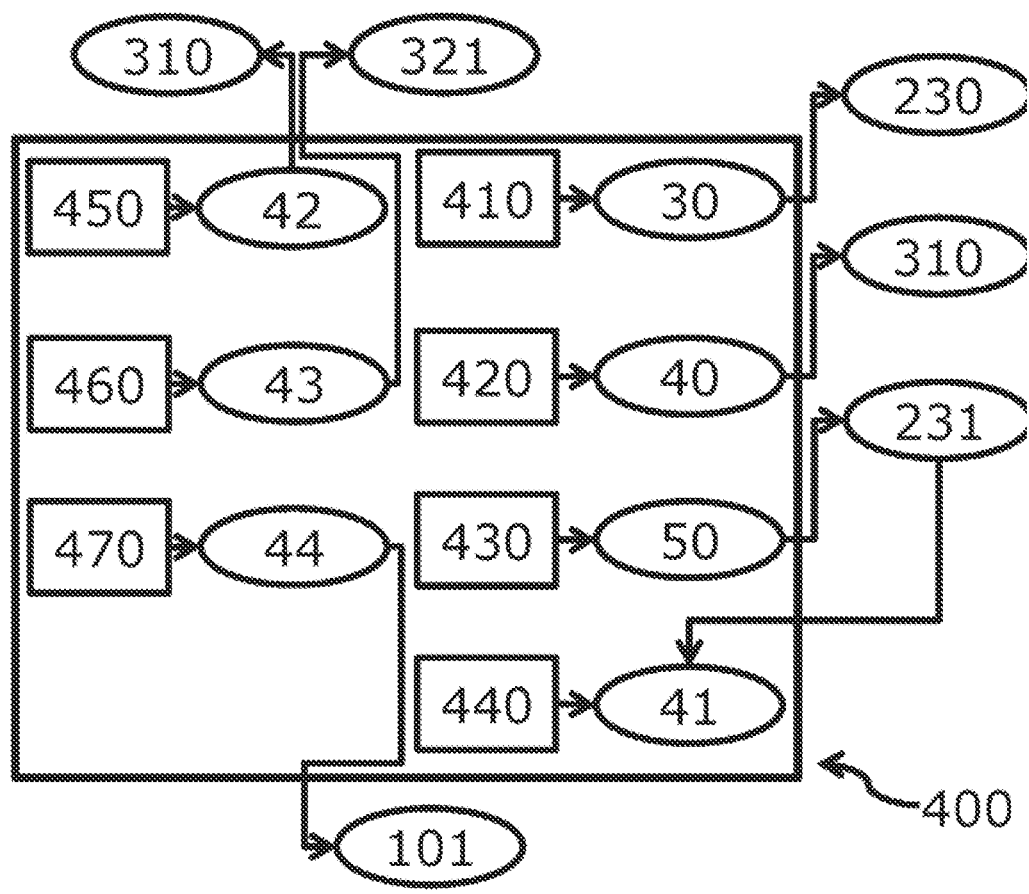
FIG. 4 shows a schematic representation of a proposed system according to a further exemplary embodiment of the invention.

FIG. 4 shows a schematic representation of a proposed system according to a further exemplary embodiment of the invention.

In this case, FIG. 4 shows a schematic representation of a proposed system 400 for collision avoidance of a motor vehicle 100 with an emergency vehicle 300. In this case, the motor vehicle 100 comprises: An optical detection arrangement 110 for optically detecting 10 the surroundings 200 of the motor vehicle 100. An acoustic detection arrangement 120 for the acoustic detection 20 of the wider surroundings 210 of the motor vehicle 100, wherein the wider surroundings 210 includes the surroundings 200. And an output arrangement 130 for outputting 45 a warning to a user of the motor vehicle 100. And in this case, the system comprises 400: A first means of determination 410 for determining 30 traffic users 230 in the surroundings 200. A means of investigation 420 for investigating 40 the wider surroundings 210 for a signal 310, wherein the signal 310 is indicative of an emergency signal of an emergency vehicle 300. A second means of determination 430 for determining 50 a trajectory of motion 231 for each detected traffic user 230. A further means of investigation 440 for investigating 41 the detected trajectories of motion 231 for swarming behavior, wherein the swarming behavior is indicative of a hazardous situation in the surroundings 200. A means of location 450 for locating a position 320 of the emergency vehicle 300. A third means of determination 460 for determining 43 a trajectory of motion 321 for the emergency vehicle 300 based on the located position 320 of the emergency vehicle 300 and the detected trajectories of motion 231 of the traffic users 230. And a means of anticipation 470 for anticipating 44 whether a collision of the motor vehicle 100 with the emergency vehicle 300 will occur for a current trajectory of motion 101 of the motor vehicle 100 and based on the detected trajectory of motion 321 for the emergency vehicle 300. And in this case, the system 250 is arranged to carry out any method according to the invention.

Figure 5:
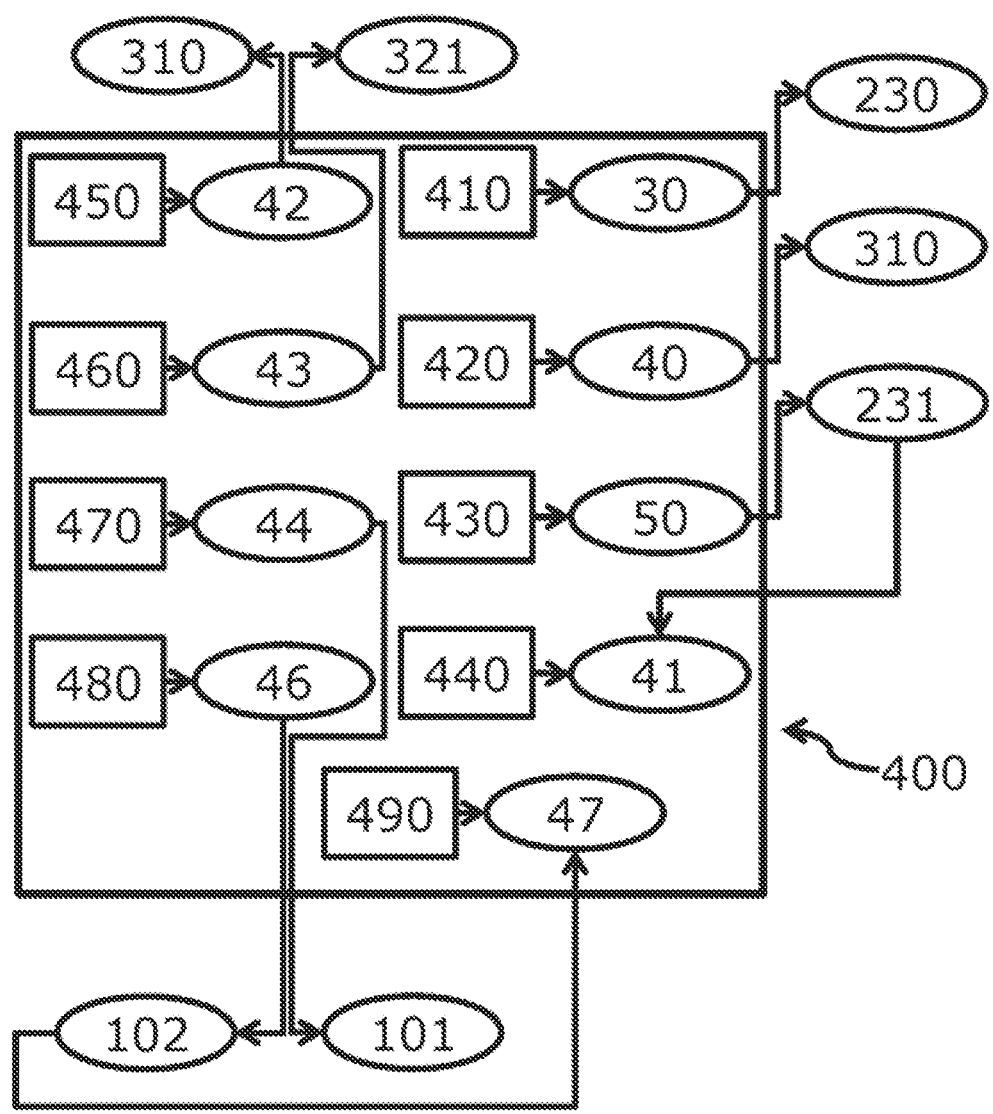
FIG. 5 shows a schematic representation of a proposed system according to a further exemplary embodiment of the invention.

FIG. 5 shows a schematic representation of a proposed system according to a further exemplary embodiment of the invention.

In this case, FIG. 5 shows a schematic representation of a system that is developed relative to FIG. 4. Statements previously made in relation to FIG. 4 therefore also apply to FIG. 5.

As can be seen in FIG. 5, the system 400 further comprises: A fourth means of determination 480 for determining 46 a collision-free trajectory of motion 102 of the motor vehicle 100. And a collision avoidance arrangement 490 for automatically applying and implementing 47 the collision-free trajectory of motion 102 by the motor vehicle 100.

Figure 6:
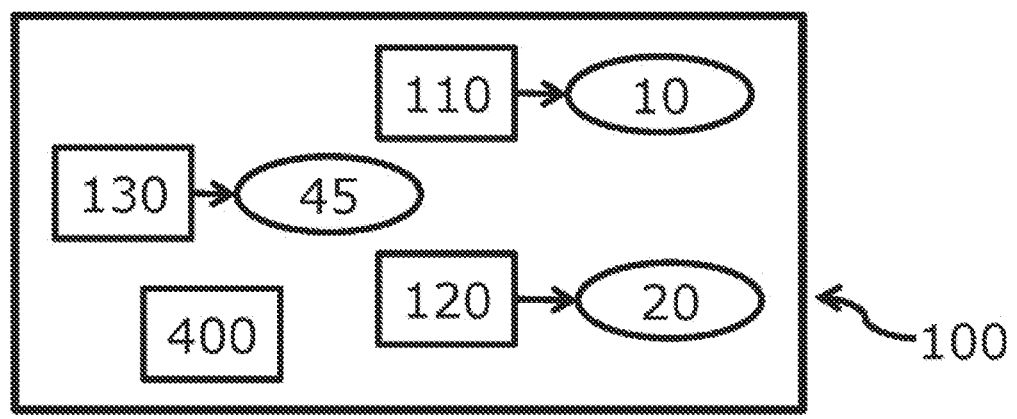
FIG. 6 shows a schematic representation of a proposed motor vehicle according to a further exemplary embodiment of the invention.

FIG. 6 shows a schematic representation of a proposed motor vehicle according to a further exemplary embodiment of the invention.

In this case, FIG. 6 shows a schematic representation of a motor vehicle 100, comprising: An optical detection arrangement 110 for the optical detection 10 of the surroundings 200 of the motor vehicle 100. An acoustic detection arrangement 120 for the acoustic detection 20 of the wider surroundings 210 of the motor vehicle 100, wherein the wider surroundings 210 includes the surroundings 200. An output arrangement 130 for outputting a warning to a user of the motor vehicle 100. And any system 400 according to the invention, wherein the system 400 is arranged to carry out any method according to the invention.

The idea of the invention can be summarized as follows. A method, a related system and a motor vehicle are provided, whereby it can be possible that collisions with emergency vehicles in the case of an emergency operation of such an emergency vehicle can be predicted and a vehicle user can be informed thereof in a timely manner. During this, the prediction can be carried out with regard to the probability. First, the emergency vehicle is detected and the position thereof is located. Further, the surroundings of the vehicle are investigated for swarming behavior of the further traffic users. It is assumed in doing so that if there is swarming behavior that indicates a hazardous situation and a signal is detected that corresponds to an emergency signal or a deployment signal of an emergency vehicle, a deployment operation of an emergency vehicle actually exists. Then a trajectory of the located emergency vehicle is predicted. Based thereon, a collision prediction is made. If said prediction indicates a collision of the motor vehicle with the emergency vehicle, a collision warning is output.

By cyclically repeating the method, the statistical significance of the prediction can be suitably increased, the closer the motor vehicle and the emergency vehicle come. Furthermore, an avoidance option can be determined in order to be able to avoid a predicted collision. The avoidance can be carried out on a freeway in such a way that it corresponds to the formation of an emergency lane. Furthermore, the avoidance can also be carried out independently, so that the motor vehicle can avoid the predicted collision itself without a driver having to carry out the avoidance.

The avoidance can also be carried out by a following emergency vehicle clearing the way for further travel by determining a suitable collision-free avoidance trajectory that can then be followed. A collision-free avoidance trajectory can then include stopping the motor vehicle to prevent a collision with an emergency vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE CHARACTER LIST

10 Optical detection of the surroundings of the motor vehicle
20 Acoustic detection of the wider surroundings of the motor vehicle
30 Determining traffic users in the surroundings
40 Investigating the wider surroundings for a signal
41 Investigating the detected trajectories of motion for swarming behavior
42 Locating the position of the emergency vehicle
43 Determining a trajectory of motion for the emergency vehicle
44 Anticipating whether a collision of the motor vehicle with the emergency vehicle will occur
45 Outputting a warning
46 Determining a collision-free trajectory of motion of the motor vehicle
47 Automatically applying and implementing the collision-free trajectory of motion
50 Determining a trajectory of motion for each detected traffic user
100 Motor vehicle
101 Current trajectory of motion of the motor vehicle
102 Collision-free trajectory of motion of the motor vehicle
110 Optical detection arrangement
120 Acoustic detection arrangement
130 Output arrangement
200 Surroundings of the motor vehicle
210 Wider surroundings of the motor vehicle
230 Traffic user in the surroundings
231 Trajectory of motion of the traffic user
300 Emergency vehicle
310 Signal
320 Position of the emergency vehicle
321 Trajectory of motion for the emergency vehicle
400 System for collision avoidance of the motor vehicle with the emergency vehicle
410 First means of determination
420 Means of investigation
430 Second means of determination
440 Further means of investigation
450 Means of location
460 Third means of determination
470 Means of anticipation
480 Fourth means of determination
490 Collision avoidance arrangement

What is claimed is:

1. A method for collision avoidance of a motor vehicle with an emergency vehicle, the method comprising the acts of:

detecting surroundings of the motor vehicle using an optical detection arrangement of the motor vehicle;

detecting wider surroundings of the motor vehicle using an acoustic detection arrangement of the motor vehicle, wherein the wider surroundings include the surroundings;

detecting non-emergency vehicle traffic users in the surroundings;

investigating the wider surroundings in order to detect a signal indicative of an emergency signal of the emergency vehicle;

determining a trajectory of motion for each of the detected non-emergency vehicle traffic users;

in response to detecting the emergency signal, investigating the determined trajectories of motion to detect behavior that is indicative of a hazardous situation in the surroundings; and in response to detecting the behavior indicative of the hazardous situation in the surroundings:
- locating a position of the emergency vehicle,
- determining a trajectory of motion for the emergency vehicle based on the position of the emergency vehicle and the determined trajectories of motion of the detected non-emergency vehicle traffic users,
- determining whether a collision of the motor vehicle with the emergency vehicle will occur for a current trajectory of motion of the motor vehicle based on the determined trajectory of motion for the emergency vehicle, and
- outputting a warning to a user of the motor vehicle based on determining that the collision will occur.

2. The method as claimed in claim 1, wherein determining the trajectory of motion for each of the detected non-emergency vehicle traffic users comprises determining a most likely trajectory of motion corresponding to each of the detected non-emergency vehicle traffic users.

3. The method as claimed in claim 1, wherein the position of the emergency vehicle corresponds to a most likely position of the emergency vehicle and the determined trajectory of motion for the emergency vehicle corresponds to a most likely trajectory of motion of the emergency vehicle.

4. The method according to claim 1, the method further comprises determining a collision-free trajectory of motion of the motor vehicle based on determining that the collision will occur.

5. The method according to claim 2, the method further comprises determining a collision-free trajectory of motion of the motor vehicle based on determining that the collision will occur.

6. The method as claimed in claim 4, the method further comprises automatically implementing the collision-free trajectory of motion by the motor vehicle.

7. The method as claimed in claim 5, the method further comprises automatically implementing the collision-free trajectory of motion by the motor vehicle.

8. The method according to claim 1, wherein the motor vehicle is a motor vehicle that is operated in a highly automated manner and/or is an autonomously operable motor vehicle.

9. The method according to claim 2, wherein the motor vehicle is a motor vehicle that is operated in a highly automated manner and/or is an autonomously operable motor vehicle.

10. The method according to claim 4, wherein the motor vehicle is a motor vehicle that is operated in a highly automated manner and/or is an autonomously operable motor vehicle.

11. The method according to claim 6, wherein the motor vehicle is a motor vehicle that is operated in a highly automated manner and/or is an autonomously operable motor vehicle.

12. The method according to claim 4, wherein
the surroundings move along the current trajectory of motion of the motor vehicle, and
the wider surroundings include an area that is different from an area of the surroundings, and/or the wider surroundings is larger than the surroundings.

13. The method according to claim 6, wherein
the surroundings move along the current trajectory of motion of the motor vehicle, and
the wider surroundings include an area that is different from an area of the surroundings, and/or the wider surroundings is larger than the surroundings.

14. The method according to claim 8, wherein
the surroundings move along the current trajectory of motion of the motor vehicle, and
the wider surroundings include an area that is different from an area of the surroundings, and/or the wider surroundings is larger than the surroundings.

15. A system for collision avoidance of a motor vehicle with an emergency vehicle, the motor vehicle comprising:
an optical detection arrangement configured to optically detect surroundings of the motor vehicle;
an acoustic detection arrangement configured to acoustically detect wider surroundings of the motor vehicle, wherein the wider surroundings include the surroundings; and
an output arrangement configured to output a warning to a user of the motor vehicle, and the system comprising:
a detection means to detect non-emergency vehicle traffic users in the surroundings;
a first investigation means to investigate the wider surroundings to detect a signal indicative of an emergency signal of an emergency vehicle;
a first determining means to determine a trajectory of motion for each of the detected non-emergency vehicle traffic users;
a second investigation means to investigate the determined trajectories of motion to detect behavior that is indicative of a hazardous situation in the surroundings;
a locating means to locate a position of the emergency vehicle;
a second determining means to determine a trajectory of motion for the emergency vehicle based on the position of the emergency vehicle and the determined trajectories of motion of the detected non-emergency vehicle traffic users; and
a third determining means to determine whether a collision of the motor vehicle with the emergency vehicle will occur for a current trajectory of motion of the motor vehicle based on the determined trajectory of motion for the emergency vehicle,
wherein the output arrangement is configured to output the warning to the user of the motor vehicle based on determining that the collision will occur.

16. The system as claimed in claim 15, further comprising:
a fourth determining means to determine a collision-free trajectory of motion of the motor vehicle; and
a collision avoidance arrangement configured to automatically implement the collision-free trajectory of motion by the motor vehicle.

17. A motor vehicle comprising:
an optical detection arrangement configured to optically detect surroundings of the motor vehicle;
an acoustic detection arrangement configured to acoustically detect wider surroundings of the motor vehicle, wherein the wider surroundings include the surroundings;
an output arrangement configured to output a warning to a user of the motor vehicle; and
a system configured to:
   detect surroundings of the motor vehicle using the optical detection arrangement of the motor vehicle,
   detect wider surroundings of the motor vehicle using the acoustic detection arrangement of the motor vehicle,
   investigate the wider surroundings in order to detect a signal indicative of an emergency signal of the emergency vehicle,
   detect non-emergency vehicle traffic users in the surroundings,
   determine a trajectory of motion for each of the detected non-emergency vehicle traffic users,
   in response to detecting the emergency signal, investigate the determined trajectories of motion to detect behavior that is indicative of a hazardous situation in the surroundings, and
   in response to detecting the behavior indicative of the hazardous situation in the surroundings:
      locate a position of the emergency vehicle,
      determine a trajectory of motion for the emergency vehicle based on the position of the emergency vehicle and the determined trajectories of motion of the detected non-emergency vehicle traffic users,
      determine whether a collision of the motor vehicle with the emergency vehicle will occur for a current trajectory of motion of the motor vehicle based on the determined trajectory of motion for the emergency vehicle, and
      output a warning to a user of the motor vehicle based on determining that the collision will occur.

\* \* \* \* \*